United States Patent [19]

Xu et al.

[11] Patent Number: 4,997,303

[45] Date of Patent: Mar. 5, 1991

[54] ECCENTRIC DOWEL PIN AND PIN-ADJUSTED STRUCTURE IN HOLE TYPE MODULAR TOOLING SYSTEMS

[75] Inventors: Changxiang Xu; Ruixing Zhuo; Qiulin Yu, all of Qing-zhen County, China

[73] Assignees: Qing-Yang Machine Works, Gui-Zhou Province; China National Aerotechnology Import and Export Corp., Beijing, both of China

[21] Appl. No.: 316,816

[22] Filed: Feb. 28, 1989

[30] Foreign Application Priority Data

Sep. 1, 1988 [CN] China .................... 88106253.7

[51] Int. Cl.$^5$ ..................... F16B 1/00; F16D 1/00
[52] U.S. Cl. ............................. 403/4; 403/409.1
[58] Field of Search .................... 403/4, 409.1, 3

[56] References Cited

U.S. PATENT DOCUMENTS

| | | | |
|---|---|---|---|
| 2,177,148 | 10/1939 | Newhall | 403/4 |
| 4,106,876 | 8/1978 | Tregoning | 403/4 |
| 4,420,272 | 12/1983 | Ingalls | 403/4 |
| 4,539,764 | 9/1985 | Pradier | 403/4 X |

*Primary Examiner*—Andrew V. Kundrat
*Attorney, Agent, or Firm*—Helfgott & Karas

[57] ABSTRACT

A set of eccentric dowel pins and a pin-adjusted structure can move interlocking features of a hole type modular tooling system directly and continuously along axes without rigging and indicating, and thus provide full flexibility to such a hole type modular tooling system.

3 Claims, 1 Drawing Sheet

ECCENTRIC DOWEL PIN AND PIN-ADJUSTED STRUCTURE IN HOLE TYPE MODULAR TOOLING SYSTEMS

FIELD OF THE INVENTION

The present invention relates to jigs and fixtures, and particularly to a set of eccentric dowel pins and a pin-adjusted structure for adjusting along an axis of interlocking features of a hole-type tooling system.

BACKGROUND OF THE INVENTION

An unrestricted workpiece has six degrees of freedom with respect to the axes of the coordinate system of which three are along-axis-moving degrees and three are around-axis-revolving degrees. For the workpiece to be machined, the relative degrees of freedom must be restricted by a jig or fixture. So, evidently, if any workpiece is to be fixed in a modular tooling system, the interlocking features of the system must be able to freely move along and revolve around the axes for the features to be adjusted where they are necessary for constructing fixture bodies and fixing locators or clamps. In other words, a good modular tooling system should have two types of adjustability, along and around the coordinate axes. Since the advantage of slots is that they offer adjustability along axes, and holes offer adjustability around axes, the available hole-type modular tooling system must be advanced to offer the full adjustability by:

(a) introducing slots into the hole-type system to solve the problem of adjustability along axes, and (b) bringing the advantage of adjustability around hole axes into full play.

The solution of adjustability along axes is covered by this patent application, and around axes is covered in U.S. patent application Ser. No. 315,409 now U.S. Pat. No. 4,961,268.

Since the above-discussed principles for modularizing of jigs and fixtures are advanced by the inventors after their thorough study of the available modular tooling technology, this invention is a result of the available technology developing from the perceptual to the rational stage.

In the slot-type modular system, slots, as is known, are available, but they can neither make the slot-type system to provide continuous adjustability along them because of crossing, nor can they permit precise and fast setups because of the problem of rigging and indicating. In the conventional hole-type system, almost no proper slots have been introduced, to say nothing of overcoming the disadvantages of slots appearing in the slot-type system.

SUMMARY OF THE INVENTION

It is an object of the present invention to provide a set of eccentric dowel pins and a pin-adjusted structure, so as to continuously adjust along the axes the interlocking features with the pin-adjusted structure without rigging and indicating, and thus, in conjunction with the aforementioned patent application Ser. No. 315,409, to provide a hole-type modular tooling system which will offer complete adjustability and permit precise and fast setups.

BRIEF DESCRIPTION OF THE DRAWINGS:

FIGS. 4a–4c are sectional views illustrating an assembly of a plate with the eccentric dowel pin and the pin-adjusted structure displaced along axes and shown in three typical positions wherein FIG. 4a is a right-hand limit position, FIG. 4b is a left-hand limit position, and FIG. 4c is their neutral position.

DETAILED DESCRIPTION OF THE PREFERRED EMBODIMENTS

Figure 1:
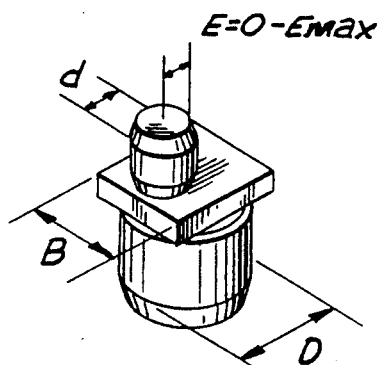
FIG. 1 is a perspective view of the eccentric dowel pin according to the invention.
Figure 2:
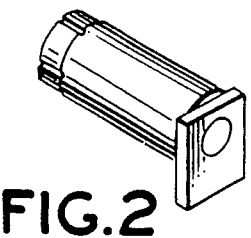
FIG. 2 is a perspective view of a key pin.
Figure 4A:
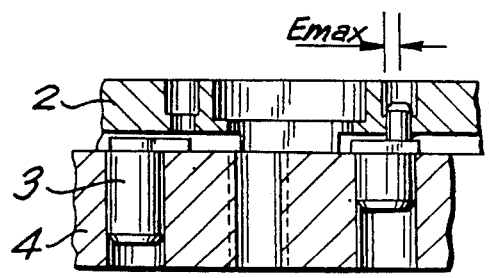
Figure 3:
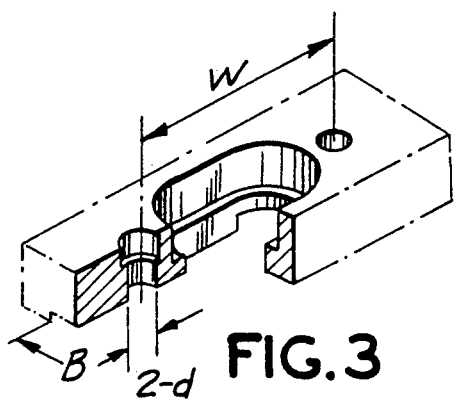
FIG. 3 is a perspective view of the pin-adjusted structure of the invention.
Figure 4B:
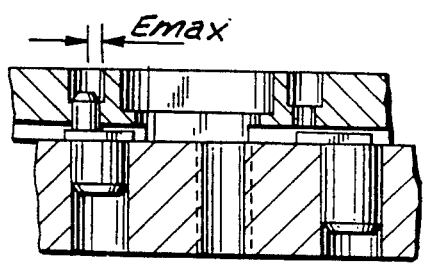
Figure 4C:
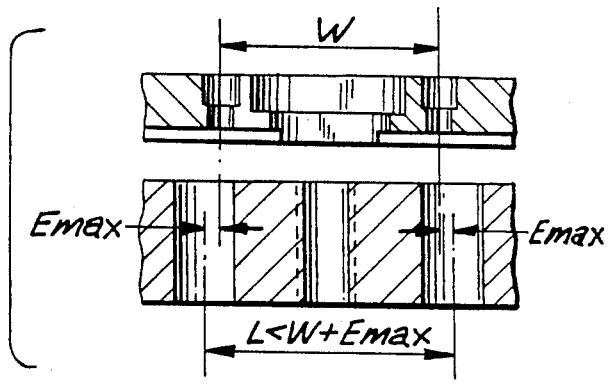

The structure according to the invention comprises a set of eccentric dowel pins 1, a pin-adjusted structure 2 and a key pin 3 (see FIGS. 1 to 4). The eccentric dowel pin 1 is a complete module, which includes a cylindrical portion 1a having diameter D and attached to the bottom of a prism 5 having width B and a cylinder portion 1b of smaller diameter d on top of the prism 5. The center lines or axes of the two cylinder portions 1a and 1b are eccentric on the symmetrical central plane of the prism 5, and the eccentricity changes from 0 to Emax in a certain increment whereby a set of different eccentric dowel pins 1 is sized out. The pin adjusted structure 2 shown in FIG. 3 is not a complete module but a constituent of some modules, and includes two apertures 6 having diameter d and spaced from each other a distance W. A keyway 7 having width B is provided in the bottom of the structure 2. A pair of counter and through slots 8 are formed between the two apertures 6. The key pin 3 is a cylindrical pin with a prism portion 9 having the width B and used as a tenon.

In use or assembly, the bottom cylinder portion 1a of the eccentric dowel pin 1 fits in a hole 10 having diameter D and spaced at distance L from a similar hole 10a, both holes 10 and 10a being formed in a plate 4. The top cylinder portion 1b of pin 1 fits in one of apertures 6 of the pin-adjusted structure 2, and the medium prism 5 fits in with the keyway. To restrict the adjusting direction, the prism portion 9 of the key pin 3 is used to fit in with the keyway 7 and whereas the pin portion of pin 3 fits in the adjacent hole 10a of the plate 4. To have an adjustment of plus or minus eccentricity ($\pm E$), the mounted direction of the eccentric dowel pin 1 can be reversed. To continuously move the pin-adjusted structure 2 to achieve 0 to 10 4Emax, the distance W must be more than or equal to distance L minus 2Emax ($W > L - 2E_{max}$), and the mounted position of the eccentric dowel pin 1 and the key pin 3 in the hole 10, 10a of the plate 4 and the adjusting aperture must be changed at the same time. Therefore, if an interlocking feature of a hole type modular tooling system is joined to the pin-adjusted structure to constitute a complete module, the interlocking feature with the structure can be moved by the set of eccentric dowel pins 1 continuously along the axes to achieve 0 to 4 Emax without rigging and indicating, to avoid disadvantages of slots in the slot type system while solving the problem of the adjustability along axes in the hole type tooling system.

The grid hole pitch of the hole type modular tooling system in which the present invention can be applied is 50 mm; the grid hole coordinate distance is 25 mm. In other words, the distance L between the two adjacent holes 10 and 10a in the plate 4 is 50 mm, and the minimum basic total distance to be adjusted continuously along axes should be 12.5 mm. Thus, to satisfy the conditions of the continuously full adjustment, the maximum eccentricity Emax of the eccentric dowel pins 1 is 3.15 mm to ensure that 4Emax is more than or equal to a fourth of L(4Emax≧L/4) and the distance W between apertures 6 of the pin-adjusted structure 2 is 43.75 mm to ensure that W is more than or equal to L minus 2Emax (W≧L-2Emax). Since, in the preferred embodiments, the eccentric dowel pins are sized into a set of 64 pieces in increments of 0.05 mm eccentricity and the serial eccentricity E in turn equals 0, 0.05, 0.10 . . . , 3.05, 3.10 and 3.15 mm, the set of 64 eccentric dowel pins can, directly but without rigging and indicating, move the interlocking features with the pin adjusted structure 2 continuously along axes in 0.05 mm increments for 0 to 12.6 mm.

I claim:

1. An adjustment assembly for hole-type modular tooling systems, comprising a set of eccentric dowel pins each having a first cylindrical portion of a greater diameter, a prism formed on the top of said first portion and having a width B, and a second cylindrical portion of a smaller diameter provided on the top of said prism, said first and second cylindrical portions being eccentrical with respect to each other on a symmetrical central plane of said prism wherein the eccentricity between said first and second cylindrical portion can be changed from 0 to Emax in a predetermined increment depending on an eccentric dowel pin of said set used in the assembly;

an pin-adjusting structure including two apertures of a diameter corresponding to that of said second cylindrical portion and spaced from each other at a distance W, a keyway formed in a bottom of said structure and having a width corresponding to that of said prism, and a pair of counter and through slots formed between said two apertures;

a key pin including a pin portion and a prism portion on the top of said pin portion; and a plate including two holes spaced rom each other at a distance L and each being of a diameter corresponding to that of said first cylindrical portion and said pin portion, wherein assembly said first cylindrical portion fits in one of said holes, said second cylindrical portion fits in one of said apertures of said structure, said prism of a dowel point fits in said keyway, and said pin portion of said key pin fits in another of said holes and said prism portion of said key pin fits in the keyway of said structure so that said key pin is used as a tenon to restrict an adjusting direction.

2. The assembly according to claim 1, wherein a serial eccentricity E of eccentric dowel pins in the set is in 0.05 mm increments and is equal to 0, 0.05, 0.10 . . . , 3.05, 3.10 and 3.15 mm.

3. The assembly according to claim 1, wherein the a value 4 Emax is at least equal to a fourth of said distance L and said distance W is at least equal to the distance L minus 2 Emax.

* * * * *